United States Patent
Kyoung et al.

(10) Patent No.: US 11,237,452 B2
(45) Date of Patent: Feb. 1, 2022

(54) OPTICAL MODULATING DEVICE, BEAM STEERING DEVICE, AND SYSTEM EMPLOYING THE SAME

(71) Applicant: SAMSUNG ELECTRONICS CO., LTD., Suwon-si (KR)

(72) Inventors: Jisoo Kyoung, Seoul (KR); Seokho Song, Seoul (KR); Changgyun Shin, Anyang-si (KR); Duhyun Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 125 days.

(21) Appl. No.: 15/683,879

(22) Filed: Aug. 23, 2017

(65) Prior Publication Data

US 2018/0059505 A1    Mar. 1, 2018

(30) Foreign Application Priority Data

Aug. 23, 2016    (KR) .................. 10-2016-0106981

(51) Int. Cl.
*G02F 1/29*    (2006.01)
(52) U.S. Cl.
CPC .......... *G02F 1/292* (2013.01); *G02F 2201/12* (2013.01); *G02F 2203/10* (2013.01)
(58) Field of Classification Search
None
See application file for complete search history.

(56) References Cited

U.S. PATENT DOCUMENTS

| | | | |
|---|---|---|---|
| 8,466,837 B2 | 6/2013 | Rentz et al. | |
| 8,525,742 B2 | 9/2013 | Yang | |
| 2012/0170097 A1* | 7/2012 | Han | B82Y 20/00 359/238 |
| 2015/0331297 A1 | 11/2015 | Han et al. | |
| 2015/0346340 A1 | 12/2015 | Yaacobi et al. | |
| 2016/0223723 A1* | 8/2016 | Han | G02B 5/008 |
| 2017/0153527 A1* | 6/2017 | Kim | G02F 1/29 |

FOREIGN PATENT DOCUMENTS

KR    101410487 B1    7/2014

OTHER PUBLICATIONS

Tanoto ("Nano-antenna in a photoconductive photomixer for highly efficient continuous wave terahertz emission" Oct. 8, 2013;).*
Yao-Wei Huang, et al., "Gate-tunable conducting oxide metasurfaces", Department of Physics, Baylor University, Aug. 26, 2016, Total 13 pages.

\* cited by examiner

*Primary Examiner* — Christopher Stanford
*Assistant Examiner* — Journey F Sumlar
(74) *Attorney, Agent, or Firm* — Sughrue Mion, PLLC

(57) ABSTRACT

An optical modulating device, a beam steering device, and a system employing the same are provided. The optical modulating device includes an active layer, a driver configured to electrically control a refraction index of the active layer, and a nano-antenna disposed on the active layer, and having a dual nano-antenna structure including a first nano-antenna and a second nano-antenna, the first nano-antenna having a length different from a length of the second nano-antenna, and the first nano-antenna being spaced apart from the second nano-antenna. The driver includes a first driver electrically connected to the first nano-antenna, and a second driver electrically connected to the second nano-antenna.

19 Claims, 18 Drawing Sheets

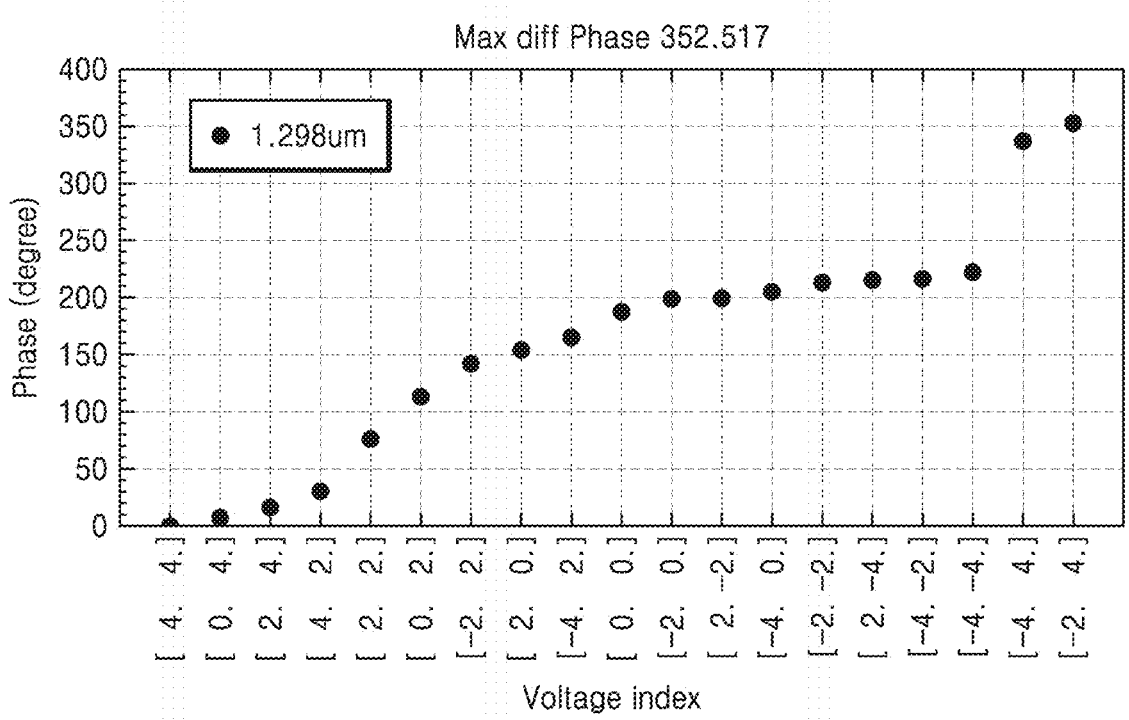

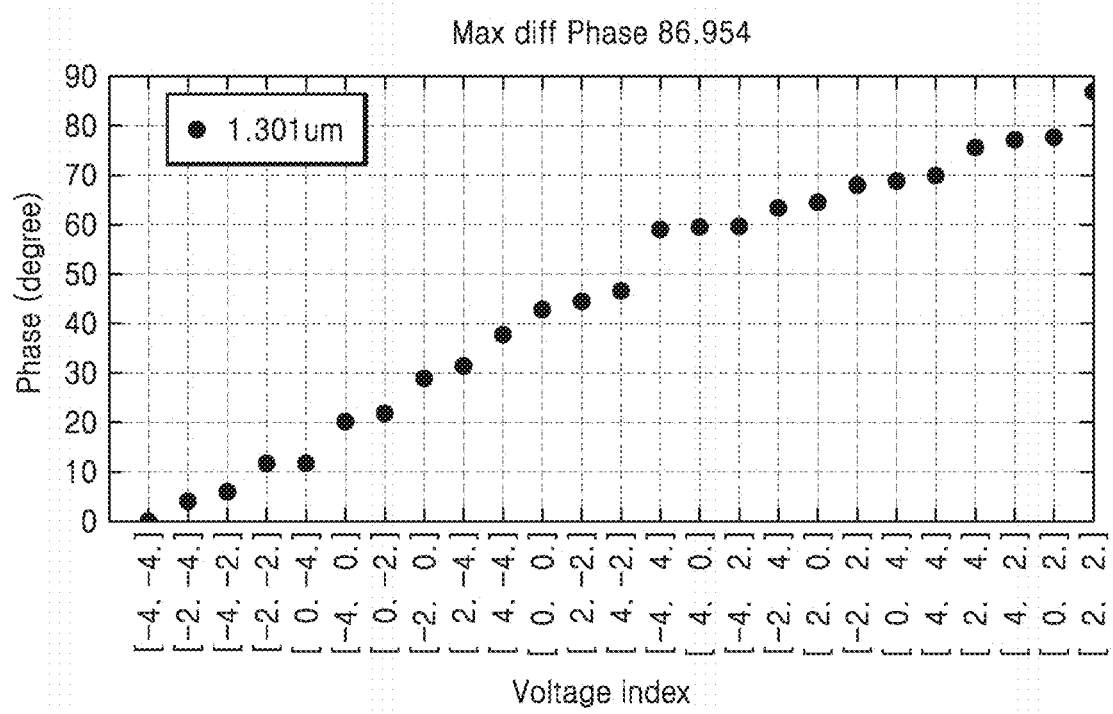

OPTICAL MODULATING DEVICE, BEAM STEERING DEVICE, AND SYSTEM EMPLOYING THE SAME

CROSS-REFERENCE TO RELATED APPLICATION

This application claims priority from Korean Patent Application No. 10-2016-0106981, filed on Aug. 23, 2016, in the Korean Intellectual Property Office, the disclosure of which is incorporated herein by reference in its entirety.

BACKGROUND

1. Field

Apparatuses and methods consistent with exemplary embodiments relate to an optical modulating device having applied thereto a nano-antenna, a beam steering device, and a system employing the same.

2. Description of the Related Art

Optical devices for changing polarization, phase, intensity, and path of incident light are utilized in various optical apparatuses. Furthermore, to control the above-stated properties in an optical system as desired, optical modulating devices having various structures are being suggested.

For example, liquid crystals having optical anisotropy and micro-electromechanical system (MEMS) using fine mechanical movements of light blocking/reflecting elements are widely used as optical modulating devices. Such optical modulating devices feature slow operation response times of about several μs due to operating mechanisms thereof.

SUMMARY

Exemplary embodiments may address at least the above problems and/or disadvantages and other disadvantages not described above. Also, the exemplary embodiments are not required to overcome the disadvantages described above, and may not overcome any of the problems described above.

Exemplary embodiments provide an optical modulating device that employs a nano-antenna for modulating phase at high speed.

Exemplary embodiments provide a beam steering device that employs a nano-antenna array for steering a light beam and a system employing the same.

According to an aspect of an exemplary embodiment, there is provided an optical modulating device including an active layer, a driver configured to electrically control a refraction index of the active layer, and a nano-antenna disposed on the active layer, and having a dual nano-antenna structure including a first nano-antenna and a second nano-antenna, the first nano-antenna having a length different from a length of the second nano-antenna, and the first nano-antenna being spaced apart from the second nano-antenna. The driver includes a first driver electrically connected to the first nano-antenna, and a second driver electrically connected to the second nano-antenna.

When the length of the first nano-antenna is denoted by L1, the length of the second nano-antenna is denoted by L2, and a distance between the first nano-antenna and the second nano-antenna is denoted by D, L1≠L2, and D may be less than L1 and L2, and is a coupling distance over which the first nano-antenna and the second nano-antenna are able to be coupled.

The first nano-antenna may include a first nano-antenna portion, and a first electrode extending from the first nano-antenna portion at an angle, the second nano-antenna may include a second nano-antenna portion, and a second electrode extending from the second nano-antenna portion at an angle, and when a direction in which the first nano-antenna is apart from the second nano-antenna is denoted as a first direction, and a direction crossing the first direction is denoted as a second direction, the length of the first nano-antenna may be a length of the first nano-antenna portion in the second direction, and the length of the second nano-antenna may be a length of the second nano-antenna portion in the second direction.

The nano-antenna may satisfy any one or any combination of conditions including the length of the first nano-antenna being from about 230 nm to about 270 nm, the length of the second nano-antenna being from about 210 nm to about 250 nm, the distance between the first nano-antenna and the second nano-antenna being less than about 120 nm, and a width of either one or both of the first nano-antenna portion and the second nano-antenna portion that is parallel to the first direction being from about 60 nm to about 80 nm.

A width of either one or both of the first electrode and the second electrode that is parallel to the second direction may be from about 100 nm to about 180 nm.

The first electrode and the second electrode may extend in opposite directions respectively from the first nano-antenna portion and the second nano-antenna portion, the opposite directions being perpendicular to the second direction.

The first nano-antenna portion may be parallel to the second nano-antenna portion.

The optical modulating device may further include a metal layer disposed below the active layer.

The optical modulating device may further include a dielectric layer disposed between the active layer and the nano-antenna.

The optical modulating device may further include an array of nano-antennas disposed on the active layer.

According to an aspect of an exemplary embodiment, there is provided a beam steering device including an active layer, a driver configured to electrically control a refraction index of the active layer, and nano-antennas disposed on the active layer, each of the nano-antennas having a dual nano-antenna structure including a first nano-antenna and a second nano-antenna, the first nano-antenna having a length different from a length of the second nano-antenna, and the first nano-antenna being spaced apart from the second nano-antenna. The driver may include a first driver electrically connected to the first nano-antenna, and a second driver electrically connected to the second nano-antenna.

When the length of the first nano-antenna is denoted by L1, the length of the second nano-antenna is denoted by L2, and a distance between the first nano-antenna and the second nano-antenna is denoted by D, L1≠L2, and D may be less than L1 and L2, and is a coupling distance over which the first nano-antenna and the second nano-antenna are able to be coupled.

The first nano-antenna may include a first nano-antenna portion, and a first electrode extending from the first nano-antenna portion at an angle, the second nano-antenna may include a second nano-antenna portion, and a second electrode extending from the second nano-antenna portion at an angle, and when a direction in which the first nano-antenna is apart from the second nano-antenna is denoted as a first direction, and a direction crossing the first direction is denoted as a second direction, the length of the first nano-antenna may be a length of the first nano-antenna portion in the second direction, and the length of the second nano-antenna may be a length of the second nano-antenna portion in the second direction.

Each of the nano-antennas may satisfy any one or any combination of conditions including the length of the first nano-antenna being from about 230 nm to about 270 nm, the length of the second nano-antenna being from about 210 nm to about 250 nm, the distance between the first nano-antenna and the second nano-antenna being less than about 120 nm, and a width of either one or both of the first nano-antenna portion and the second nano-antenna portion that is parallel to the first direction being from about 60 nm to about 80 nm.

A width of either one or both of the first electrode and the second electrode that is parallel to the second direction may be from about 100 nm to about 180 nm.

The first electrode and the second electrode may extend in opposite directions respectively from the first nano-antenna portion and the second nano-antenna portion, the opposite directions being perpendicular to the second direction.

The first nano-antenna portion may be parallel to the second nano-antenna portion.

The optical modulating device may further include a metal layer disposed below the active layer.

The optical modulating device may further include a dielectric layer disposed between the active layer and the nano-antenna.

A system may include the beam steering device configured to steer an incident light beam to be reflected at an angle, a driving circuit configured to electrically control the active layer, and a light source configured to emit the incident light beam to the beam steering device.

BRIEF DESCRIPTION OF THE DRAWINGS

The above and/or other aspects will become apparent and more readily appreciated from the following description of exemplary embodiments, taken in conjunction with the accompanying drawings in which:

FIG. 8A is a graph showing phase changes of the optical modulating device, based on combinations of a voltage V1 of a first driver and a voltage V2 of a second driver applied to the optical modulating device of FIG. 7;

FIG. 10A is a graph showing phase changes of the optical modulating device, based on combinations of a voltage V1 of a first driver and a voltage V2 of a second driver applied to the optical modulating device of FIG. 9;

DETAILED DESCRIPTION

Figure 1:
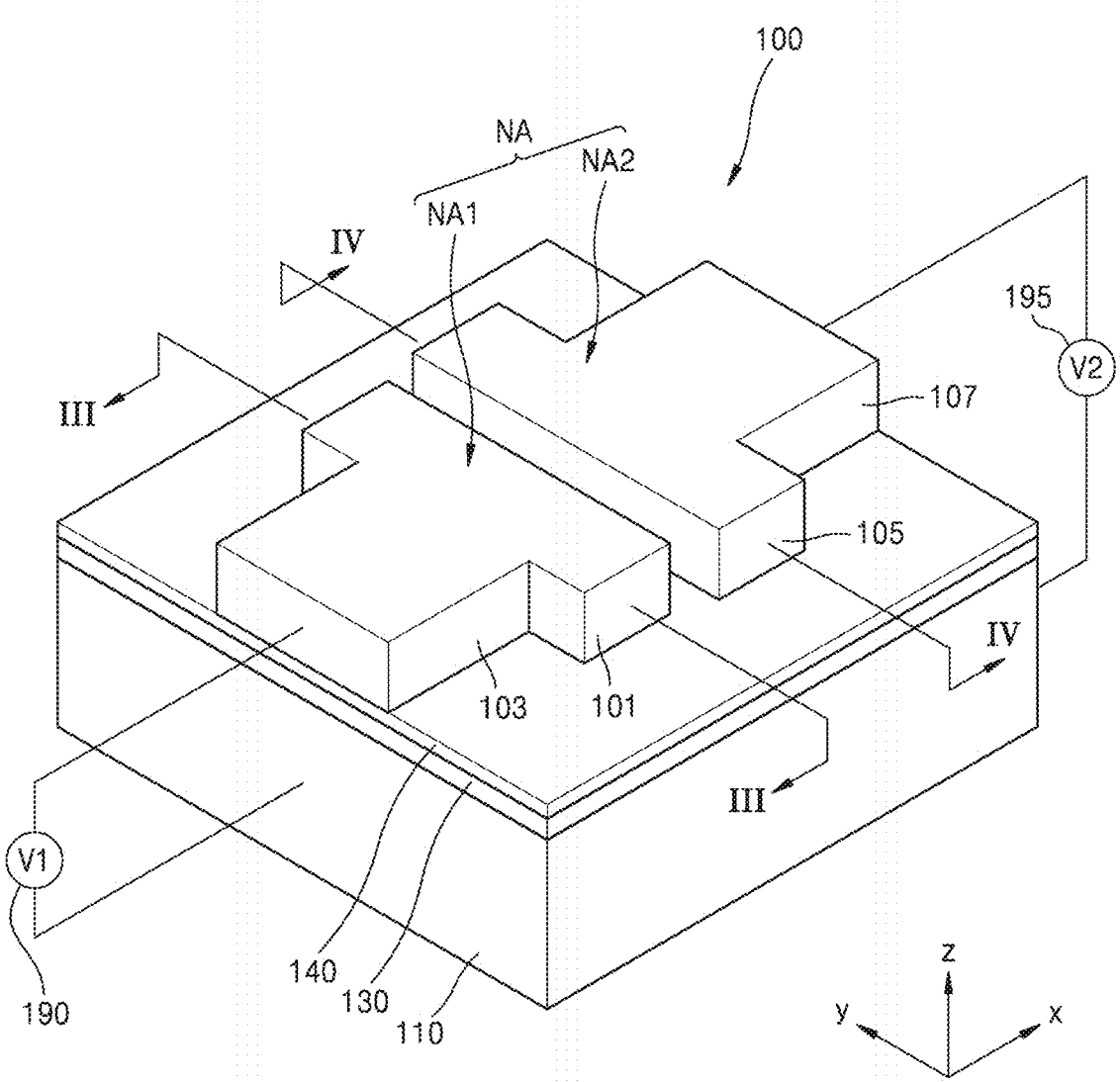
FIG. 1 is a schematic perspective view of an optical modulating device according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail because they would obscure the description with unnecessary detail.

Expressions such as "at least one of," when preceding a list of elements, modify the entire list of elements and do not modify the individual elements of the list. It will be understood that when an element or layer is referred to as being "on" another element or layer, the element or layer can be directly on another element or layer or intervening elements or layers.

Figure 2:
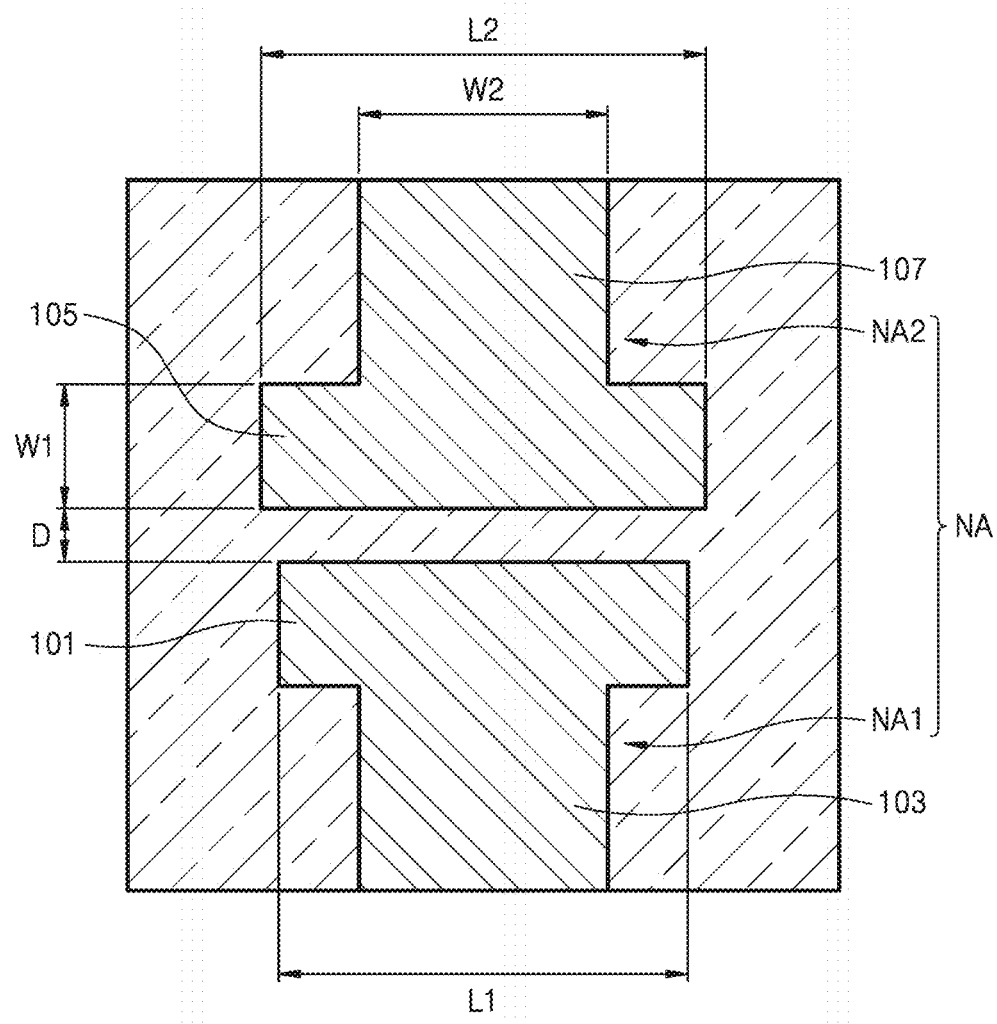
FIG. 2 is a plan view of the optical modulating device of FIG. 1.
Figure 3:
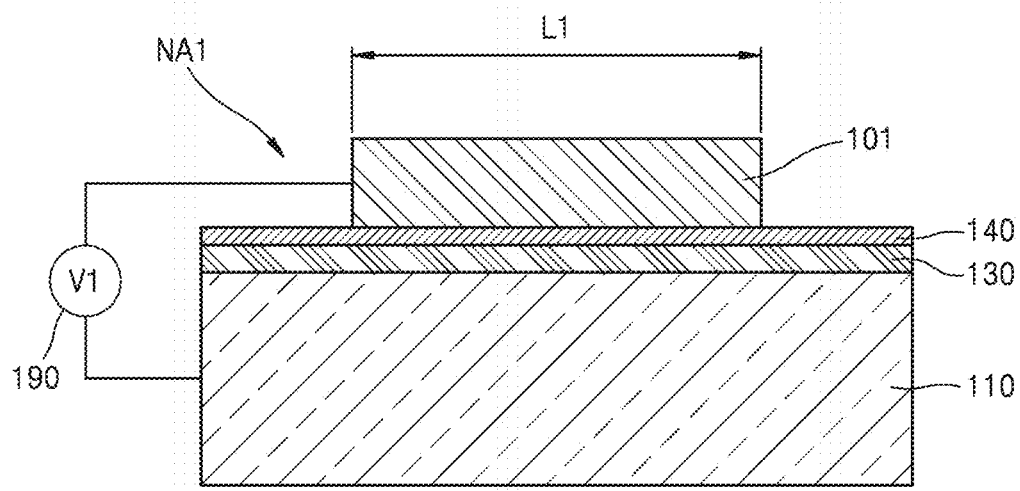
FIG. 3 is a sectional view of the optical modulating device of FIG. 1, obtained along a line III-III.
Figure 4:
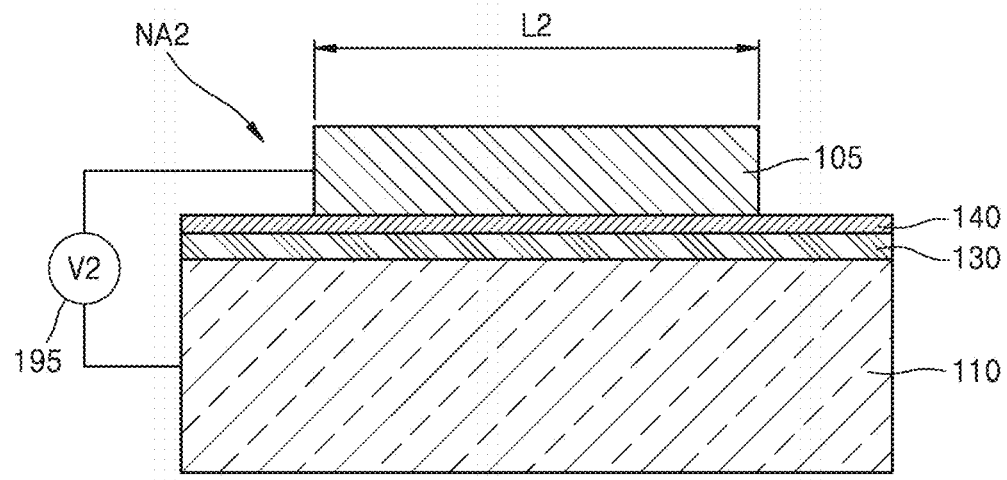
FIG. 4 is a sectional view of the optical modulating device of FIG. 1, obtained along a line IV-IV.

FIG. 1 is a schematic perspective view of an optical modulating device 100 according to an exemplary embodiment. FIG. 2 is a plan view of the optical modulating device 100 of FIG. 1, FIG. 3 is a sectional view of the optical modulating device 100 of FIG. 1, obtained along a line III-III, and FIG. 4 is a sectional view of the optical modulating device 100 of FIG. 1, obtained along a line IV-IV.

Referring to FIGS. 1 through 4, the optical modulating device 100 may include an active layer 130 of which refraction index is changed according to electric control, first and second drivers 190 and 195 for electrically controlling the refraction index of the active layer 130, and a nano-antenna NA disposed on the active layer 130. The nano-antenna NA includes first and second nano-antennas NA1 and NA2 that have different lengths and are apart from each other, thereby having a dual nano-antenna structure. The refraction index of the active layer 130 may be electrically controlled by the first and second drivers 190 and 195. The optical modulating device 100 may further include a metal layer 110 below the active layer 130. Furthermore, the optical modulating device 100 may further include a dielectric layer 140 between the active layer 130 and the nano-antenna NA. The active layer 130, the dielectric layer 140, and the nano-antenna NA may be stacked on the metal layer 110 in the order stated.

The active layer 130 may include a material of which optical characteristics, e.g., refraction index, is changed according to an external signal. The external signal may be an electric signal. For example, the active layer 130 may include a transparent conductive oxide (TCO), such as indium tin oxide (ITO), indium zinc oxide (IZO), aluminum zinc oxide (AZO), gallium zinc oxide (GZO), aluminum gallium zinc oxide (AGZO), and gallium indium zinc oxide (GIZO). Furthermore, a transition metal nitride, such as TiN, ZrN, HfN, and TaN, may also be applied in the active layer 130. Furthermore, an electro-optical material of which effective permittivity is changed when an electric signal is applied thereto, such as $LiNbO_3$, $LiTaO_3$, potassium tantalate niobate (KTN), lead zirconate titanate (PZT), and various electro-optical polymer materials, may be applied in the active layer 130. Alternatively, the active layer 130 may include a material of which permittivity is changed as a phase change occurs at or above a temperature when heat is applied thereto, e.g., $VO_2$, $VO_2O_3$, EuO, MnO, CoO, $CoO_2$, $LiCoO_2$, or $Ca_2RuO_4$.

The active layer 130 may include an active region of which carrier concentration is changed based on a voltage applied between the active layer 130 and the nano-antenna NA. The active region may be formed in the active layer 130 near the dielectric layer 140, where the carrier concentration of the active region may be changed according to a voltage applied between the active layer 130 and the nano-antenna NA. Modulation of light incident to the optical modulating device 100 may be controlled based on the carrier concentration of the active region. Here, the active region refers to a portion of the active layer 130 near the dielectric layer 140, the portion of which carrier concentration is changed according to a voltage applied between the active layer 130 and the nano-antenna NA.

Permittivity of the active layer 130 and refraction index based on the permittivity vary according to wavelengths. Relative permittivity $\varepsilon_r$ regarding permittivity $\varepsilon_0$ of vacuum is referred to as dielectric constant, and the real part of the dielectric constant of the active layer 130 has a value of 0 in a wavelength band.

A wavelength band in which the real part of the dielectric constant has a value of 0 or a value very close to 0 is referred to as an epsilon near zero (ENZ) wavelength band. Dielectric constants of most materials are expressed as functions of wavelengths and may be expressed as complex numbers. The dielectric constant of vacuum is 1, and the real parts of dielectric constants of common dielectric materials are positive numbers greater than 1. The real parts of dielectric constants of metals may be negative numbers. Although dielectric constants of most materials have values greater than 1, the real parts of dielectric constants may have a value of 0 at a wavelength.

It is known that, when the real part of a dielectric constant has a value of 0 or a value very close to 0, unique optical characteristics are observed, and the optical modulating device 100 according to an exemplary embodiment may set a band including the ENZ wavelength band of the active layer 130 as its operating wavelength band. In other words, by setting the resonance wavelength band of the nano-antenna NA to be similar to the ENZ wavelength band of the active layer 130, a range of controlling optical modulation efficiency based on an applied voltage may be widened.

The ENZ wavelength band of the active layer 130 may differ according to carrier concentration of the active region. To utilize the ENZ wavelength band of the active layer 130, a range of voltages applied between the active layer 130 and the nano-antenna NA by the first and second drivers 190 and 195 may be a range in which the resonance wavelength of the nano-antenna NA is identical to a wavelength at which the active layer 130 exhibits the ENZ property.

Because carrier concentration of the active region of the active layer 130 is determined by an applied voltage, a suitable range of voltages to be applied to the optical modulating device 100 for a desired optical modulation range may be set by taking resonance wavelength band of the nano-antenna NA into account.

As described above, carrier concentration of the active region of the active layer 130 varies according to an applied voltage, and thus the permittivity of the active region of the active layer 130 is changed. As a result, the refraction index of the active region of the active layer 130 is changed. Therefore, phase change may be induced.

The nano-antenna NA includes a conductive material, is an artificial structure having a sub-wavelength shape dimension, and largely collects light of a wavelength band. Here, the term sub-wavelength refers to a dimension smaller than an operation wavelength of the nano-antenna NA, that is, a wavelength. At least any one of the dimensions constituting the shape of the nano-antenna NA, e.g., thickness, length, width, and a separation distance, may be a sub-wavelength dimension.

A conductive material constituting the nano-antenna NA may be a highly-conductive metal on which surface plasmon excitation may occur. For example, the conductive material constituting the nano-antenna NA may include any one or any combination of copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), gold (Au) and osmium (Os) or an alloy including any one or any combination of the above-stated metals. Furthermore, the conductive material constituting the nano-antenna NA may include a highly-conductive 2-dimensional material, such as graphene, or a conductive oxide.

The function of the nano-antenna NA is based on surface plasmon resonance that occurs at the interface between a metal and a dielectric material and the wavelength of the resonance may vary according to detailed shapes of the nano-antenna NA.

In the optical modulating device 100 according to an exemplary embodiment, the nano-antenna NA includes first and second nano-antennas NA1 and NA2 that have different lengths and are apart from each other, thereby having a dual nano-antenna structure.

Referring to FIG. 2, when the length of the first nano-antenna NA1 is denoted by L1, the length of the second nano-antenna NA2 is denoted by L2, and a distance between the first nano-antenna NA1 and the second nano-antenna NA2 is denoted by D, wherein L1≠L2, and D may be less than L1 and L2. Here, the distance D between the first nano-antenna NA1 and the second nano-antenna NA2 may be a distance over which the first nano-antenna NA1 and the second nano-antenna NA2 may be coupled with each other.

The first nano-antenna NA1 may include a first nano-antenna 101 and a first electrode 103 extending from the first nano-antenna 101 at an angle. The second nano-antenna NA2 may include a second nano-antenna 105 and a second electrode 107 extending from the second nano-antenna 105 at an angle. Here, although it is stated that each of the first nano-antenna NA1 and the second nano-antenna NA2 includes a nano-antenna and an electrode, the nano-antenna and the electrode are not clearly distinguished from each other, and thus a mainly functioning portion of the nano-antenna NA may be considered as the nano-antenna and the remaining portion of the nano-antenna NA may be considered as the electrode.

When a direction in which the first nano-antenna NA1 and the second nano-antenna NA2 are apart from each other, that is, the x-axis direction, is denoted as a first direction and a direction crossing the first direction, that is, the y-axis direction, is denoted as a second direction, the length of the first nano-antenna NA1 may correspond to the length of the first nano-antenna 101 in the second direction, whereas the length of the second nano-antenna NA2 may correspond to the length of the second nano-antenna 105 in the second direction.

Surfaces of the first and second nano-antennas NA1 and NA2 apart from each other may be parallel to each other. In other words, surfaces of the first and second nano-antennas 101 and 105 facing each other may be parallel to each other.

The first electrode 103 and the second electrode 107 may extend in directions opposite to each other with respect to the first nano-antenna 101 and the second nano-antenna 105. For example, the first electrode 103 may extend in a direction crossing the lengthwise direction of the first nano-antenna NA1, whereas the second electrode 107 may extend in a direction crossing the lengthwise direction of the second nano-antenna 105.

As described above, carrier concentration of the active region of the active layer 130 is changed according to an applied voltage. As a result, refraction index is changed, and thus phase change is induced. Here, the respective lengths L1 and L2 of the first nano-antenna NA1 and the second nano-antenna NA2, a difference between the lengths L1 and L2 of the first and second nano-antennas NA1 and NA2, and the distance D between the first and second nano-antennas NA1 and NA2 may be determined, such that the first and second nano-antennas NA1 and NA2 are coupled with each other to induce greater phase change.

For example, the length L1 of the first nano-antenna NA1 may be from about 230 nm to about 270 nm, whereas the length L2 of the second nano-antenna NA2 may be from about 210 nm to about 250 nm. Here, the length L1 of the first nano-antenna NA1 and the length L2 of the second nano-antenna NA2 may be different from each other. Alternatively, the length L1 of the first nano-antenna NA1 and the length L2 of the second nano-antenna NA2 may be identical to each other. The distance D between the first nano-antenna NA1 and the second nano-antenna NA2 may be less than about 120 nm, e.g., less than or equal to 60 nm. A width W1 of either one or both of the first nano-antenna 101 and the second nano-antenna 105 parallel to the direction in which the first nano-antenna NA1 and the second nano-antenna NA2 are apart from each other may be from about 60 nm to about 80 nm. Furthermore, a width W2 of either one or both of the first electrode 103 and the second electrode 107 parallel to the lengthwise direction of first and second nano-antennas NA1 and NA2 may be from about 100 nm to about 180 nm.

In the optical modulating device 100 according to an exemplary embodiment, under the condition of including the first nano-antenna NA1 and the second nano-antenna NA2 that are a coupling distance apart from each other, the nano-antenna NA may be formed to satisfy any one or any combination of the above-stated number conditions.

In the optical modulating device 100 according to an exemplary embodiment, by configuring the nano-antenna NA having a dual nano-antenna structure, a large phase change may be induced by coupling between the first and second nano-antennas NA1 and NA2 that are parallel to each other.

The metal layer 110 may function as an electrode that applies a voltage to between the metal layer 110 and the nano-antenna NA and may also function as a reflective mirror layer for reflecting light.

When the metal layer 110 is disposed, a voltage may be applied between the nano-antenna NA and the metal layer 110 as occasion demands. Here, by applying a voltage applied between the nano-antenna NA and the dielectric layer 140, the metal layer 110 may only be used as a reflective mirror layer.

The metal layer 110 may include at least one selected from various metals for performing the above-stated functions, e.g., copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), and gold (Au).

The dielectric layer 140 may include a material such as $Al_2O_3$, $HfO_2$, MgO, or $SiO_2$.

The first and second drivers 190 and 195 may be electrically connected to the first nano-antenna NA1 and the second nano-antenna NA2, respectively. For example, the first driver 190 may be electrically connected to apply a voltage V1 between the metal layer 110 and the first nano-antenna NA1. For example, the second driver 195 may be electrically connected to apply a voltage V2 between the metal layer 110 and the second nano-antenna NA2. Here, the first driver 190 may also be electrically connected to apply a voltage between the dielectric layer 140 and the first nano-antenna NA1, whereas the second driver 195 may also be electrically connected to apply a voltage between the dielectric layer 140 and the second nano-antenna NA2. The first and second drivers 190 and 195 may apply voltages independently. The amount of phase change that occurs at the optical modulating device 100 may be adjusted by combining voltages independently applied by the first and second drivers 190 and 195 with each other.

In the optical modulating device 100 described above, by changing the voltages V1 and V2 respectively applied between the metal layer 110 and the first nano-antenna NA1 and between the metal layer 110 and the second nano-antenna NA2, carrier concentration of the active layer 130 may be changed, thereby causing phase change and adjusting the amount of phase change.

Hereinafter, a detailed example of designs of the optical modulating device 100 and maximum amount of phase change based on the designs will be described.

Figure 5:
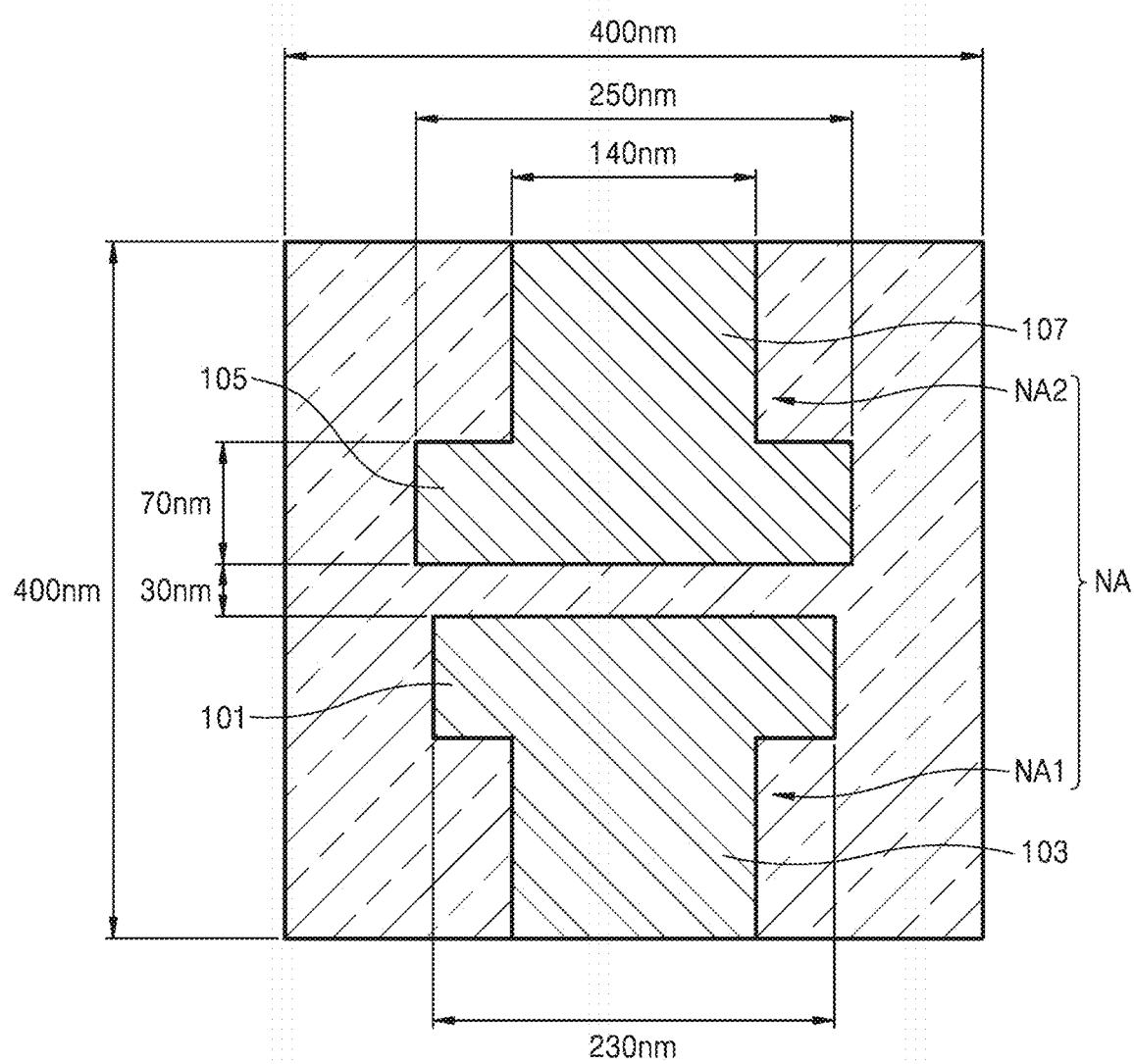
FIG. 5 is a diagram showing a detailed example of an optical modulating device according to an exemplary embodiment.
Figure 6A:
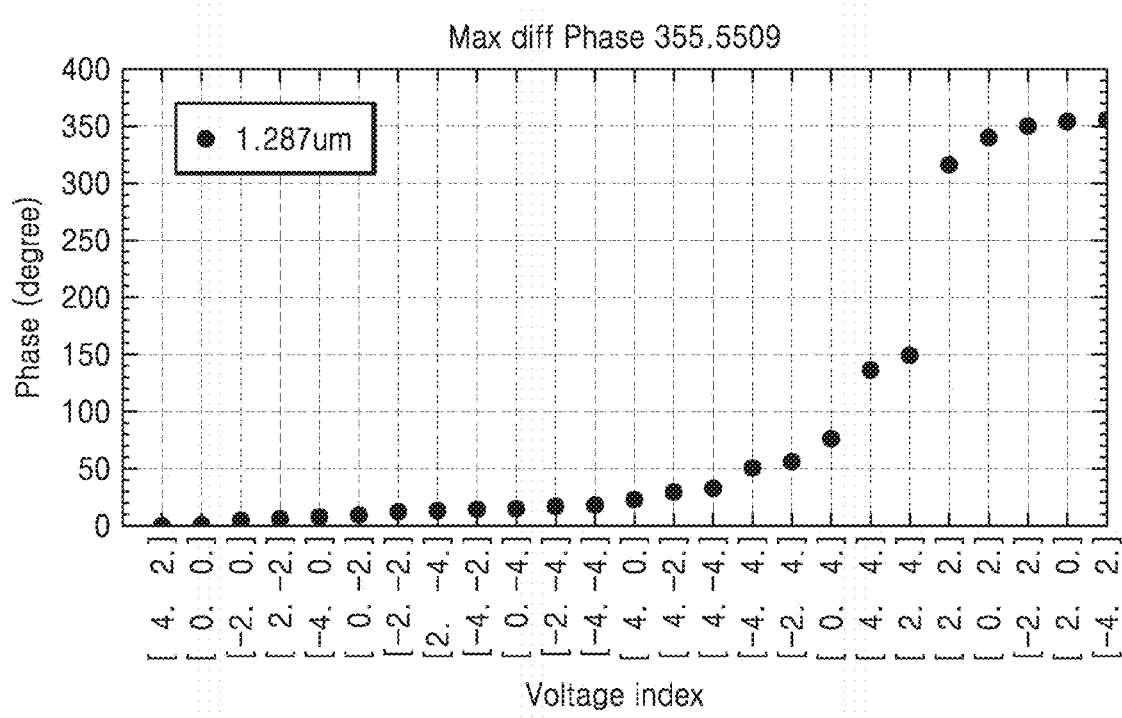
FIG. 6A is a graph showing phase changes of the optical modulating device, based on combinations of a voltage V1 of a first driver and a voltage V2 of a second driver applied to the optical modulating device of FIG. 5.
Figure 6B:
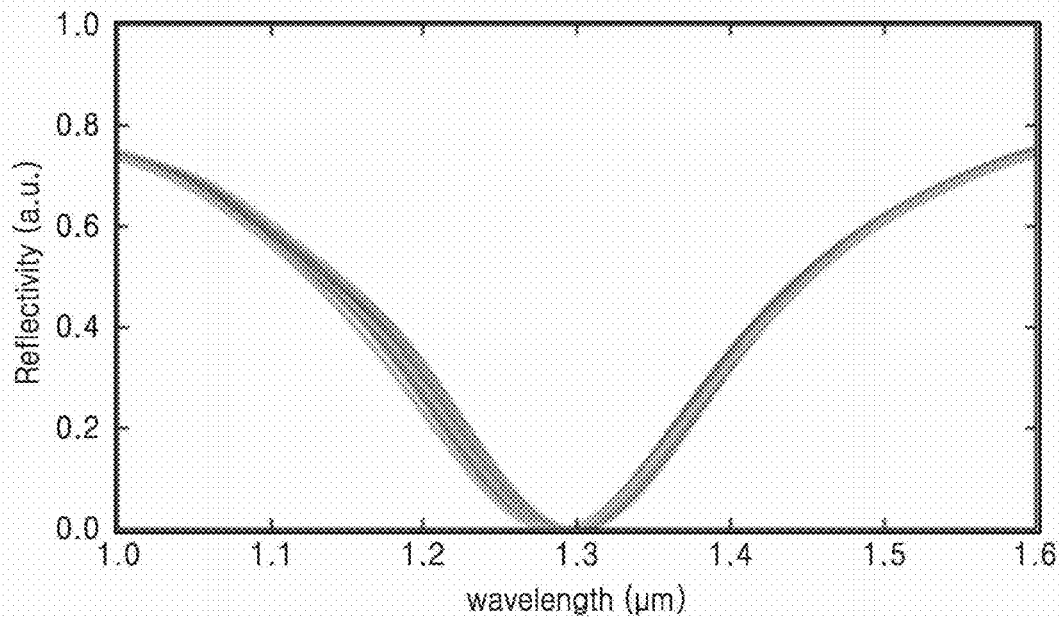
FIG. 6B is a graph showing reflectivity characteristics of the optical modulating device of FIG. 5, based on wavelengths.
Figure 6C:
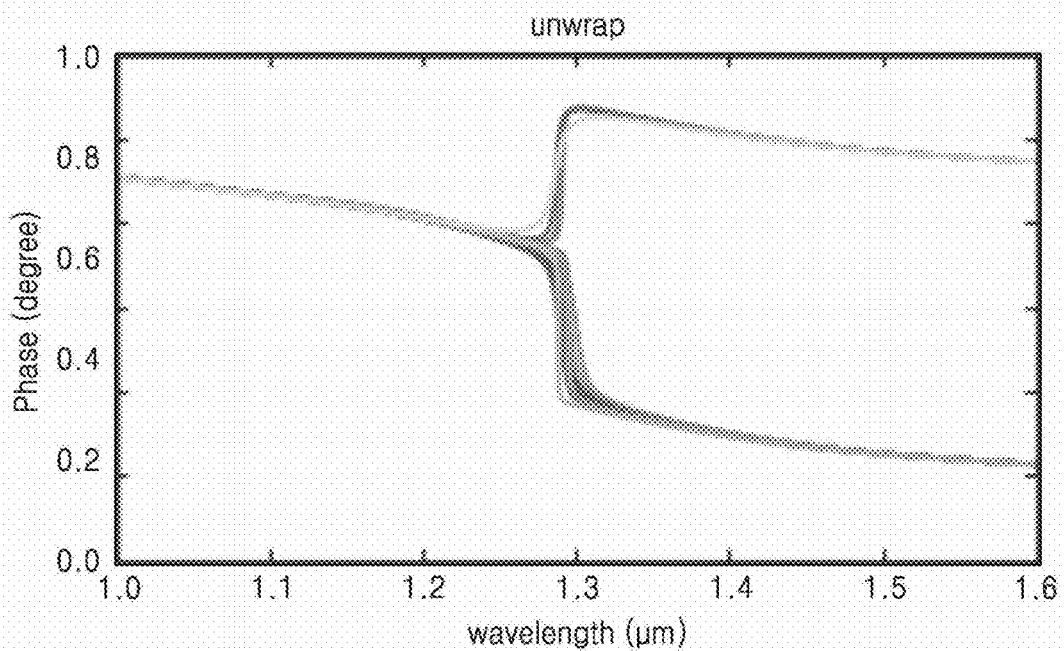
FIG. 6C is a diagram showing phase characteristics of the optical modulating device of FIG. 5, based on wavelengths.

FIG. 5 is a diagram showing a detailed example of the optical modulating device 100 according to an exemplary embodiment. FIG. 6A is a graph showing phase changes of the optical modulating device 100, based on combinations of the voltage V1 of the first driver 190 and the voltage V2 of the second driver 195 applied to the optical modulating device 100 of FIG. 5. FIG. 6B is a graph showing reflectivity characteristics of the optical modulating device 100 of FIG. 5, based on wavelengths. FIG. 6C is a diagram showing phase characteristics of the optical modulating device 100 of FIG. 5, based on wavelengths. Thicknesses of the active layer 130, the dielectric layer 140, and the nano-antenna NA of the optical modulating device 100, applied to obtain the results shown in FIGS. 6A through 6C, were about 15 nm, about 10 nm, and about 50 nm, respectively.

Referring to FIG. 5, the length L1 of the first nano-antenna NA1 is about 230 nm, the length L2 of the second nano-antenna NA2 is about 250 nm, the distance D between the first and second nano-antennas NA1 and NA2 is about 30 nm, the width of each of the first and second nano-antennas NA1 and NA2 in the first direction is about 70 nm, and the width of each of the first electrode 103 and the second electrode 107 in the second direction is about 140 nm. Each of the lengths of the stacked structure including the active layer 130, the dielectric layer 140, and the metal layer 110 in the first direction and the second direction is about 400 nm.

Change of reflectivity and phase change were obtained by changing a combination of the first voltage V1 and the second voltage V2 applied to the optical modulating device 100, as shown in FIG. 5, as indicated by the horizontal axis of the graph shown in FIG. 6A and gradually changing the wavelength of incident light as indicated by the horizontal axes of the graphs shown in FIGS. 6B and 6C.

As shown in FIGS. 6A through 6C, the maximum phase change amount 355.5509 was obtained at the wavelength of about 1.287 μm.

Figure 7:
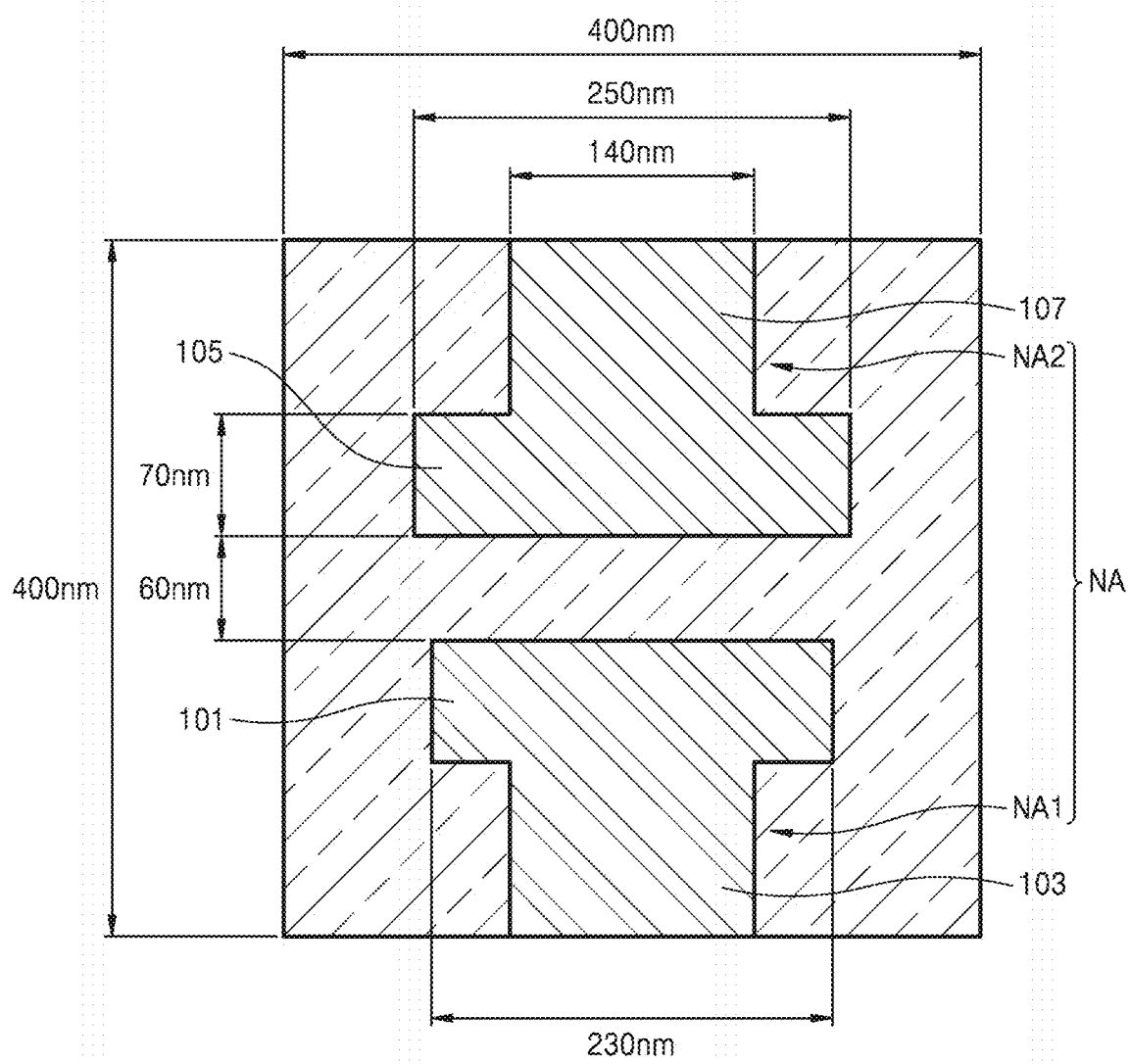
FIG. 7 is a diagram showing another detailed example of an optical modulating device according to an exemplary embodiment.
Figure 8B:
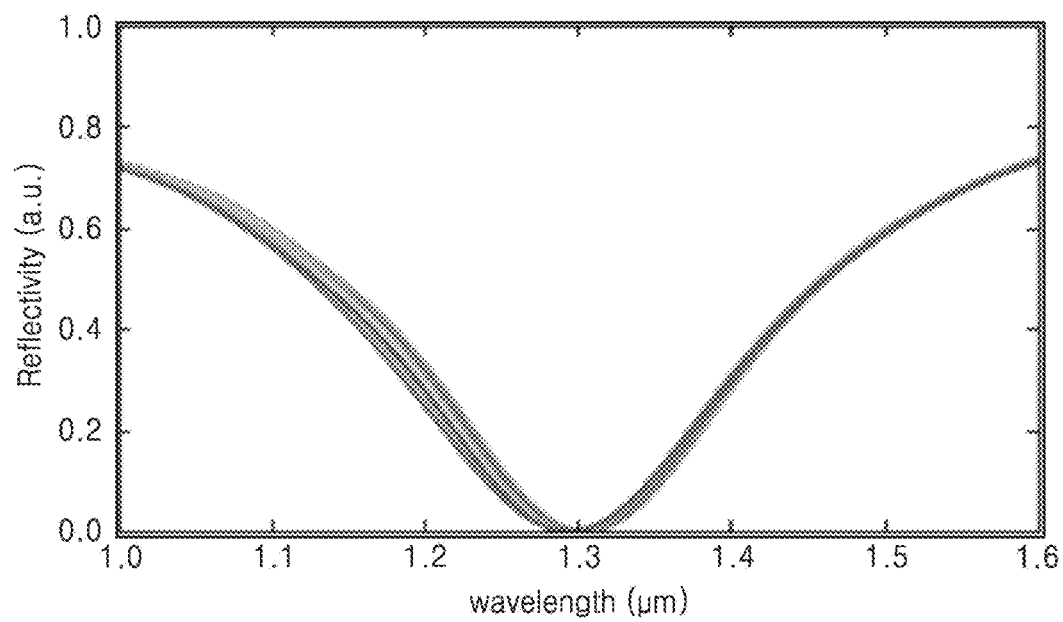
FIG. 8B is a graph showing reflectivity characteristics of the optical modulating device of FIG. 7, based on wavelengths.
Figure 8C:
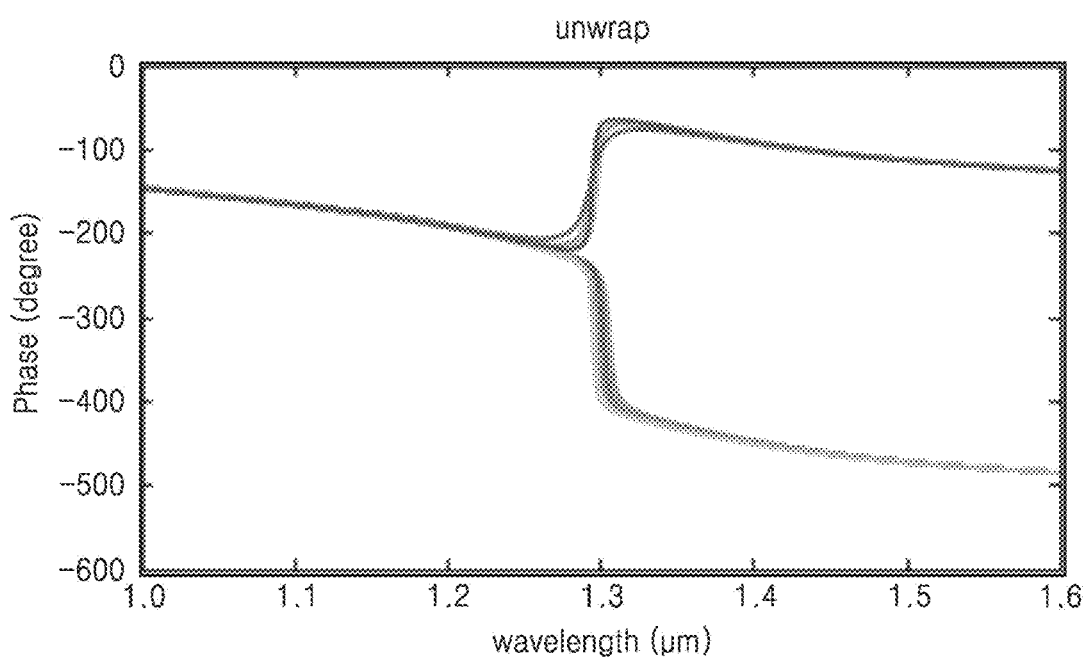
FIG. 8C is a diagram showing phase characteristics of the optical modulating device of FIG. 7, based on wavelengths.

FIG. 7 is a diagram showing another detailed example of the optical modulating device 100 according to an exemplary embodiment. FIG. 8A is a graph showing phase changes of the optical modulating device 100, based on combinations of the voltage V1 of the first driver 190 and the voltage V2 of the second driver 195 applied to the optical modulating device 100 of FIG. 7. FIG. 8B is a graph showing reflectivity characteristics of the optical modulating device 100 of FIG. 7, based on wavelengths. FIG. 8C is a diagram showing phase characteristics of the optical modulating device 100 of FIG. 7, based on wavelengths. Dimensions of the optical modulating device 100 of FIG. 7 used to obtain the results shown in FIGS. 8A through 8C are identical to those of the optical modulating device 100 of FIG. 5 except that the distance D between the first and second nano-antennas NA1 and NA2 was changed to about 60 nm. As the distance D between the first and second nano-antennas NA1 and NA2 was changed from about 30 nm to about 60 nm, lengths of the first electrode 103 and the second electrode 107 in the first direction were reduced.

Phase change were obtained by changing a combination of the first voltage V1 and the second voltage V2 applied to the optical modulating device 100 as shown in FIG. 7 as indicated by the horizontal axis of the graph shown in FIG. 8A and gradually changing the wavelength of incident light as indicated by the horizontal axes of the graphs shown in FIGS. 8B and 8C.

As shown in FIGS. 8A through 8C, the maximum phase change amount 352.517 degrees was obtained at the wavelength of about 1.298 μm.

As indicated by the results shown in FIGS. 5, 6A through 6C, 7, and 8A through 8C, by disposing the nano-antenna NA having a dual nano-antenna structure in which the first nano-antenna NA1 and the second nano-antenna NA2 are a coupling distance apart from each other, the maximum phase change amount close to 360 degrees could be obtained.

On the contrary, even when the nano-antenna NA has a dual nano-antenna structure including the first and second nano-antennas NA1 and NA2, no coupling effect may be obtained with a far distance between the first and second nano-antennas NA1 and NA2, and thus the maximum phase change amount may become smaller than that of a single nano-antenna structure. Furthermore, when a single nano-antenna structure is applied, no coupling effect is applied, and thus it is difficult to obtain a maximum phase change amount equal to or greater than about 270 degrees, for example.

Figure 9:
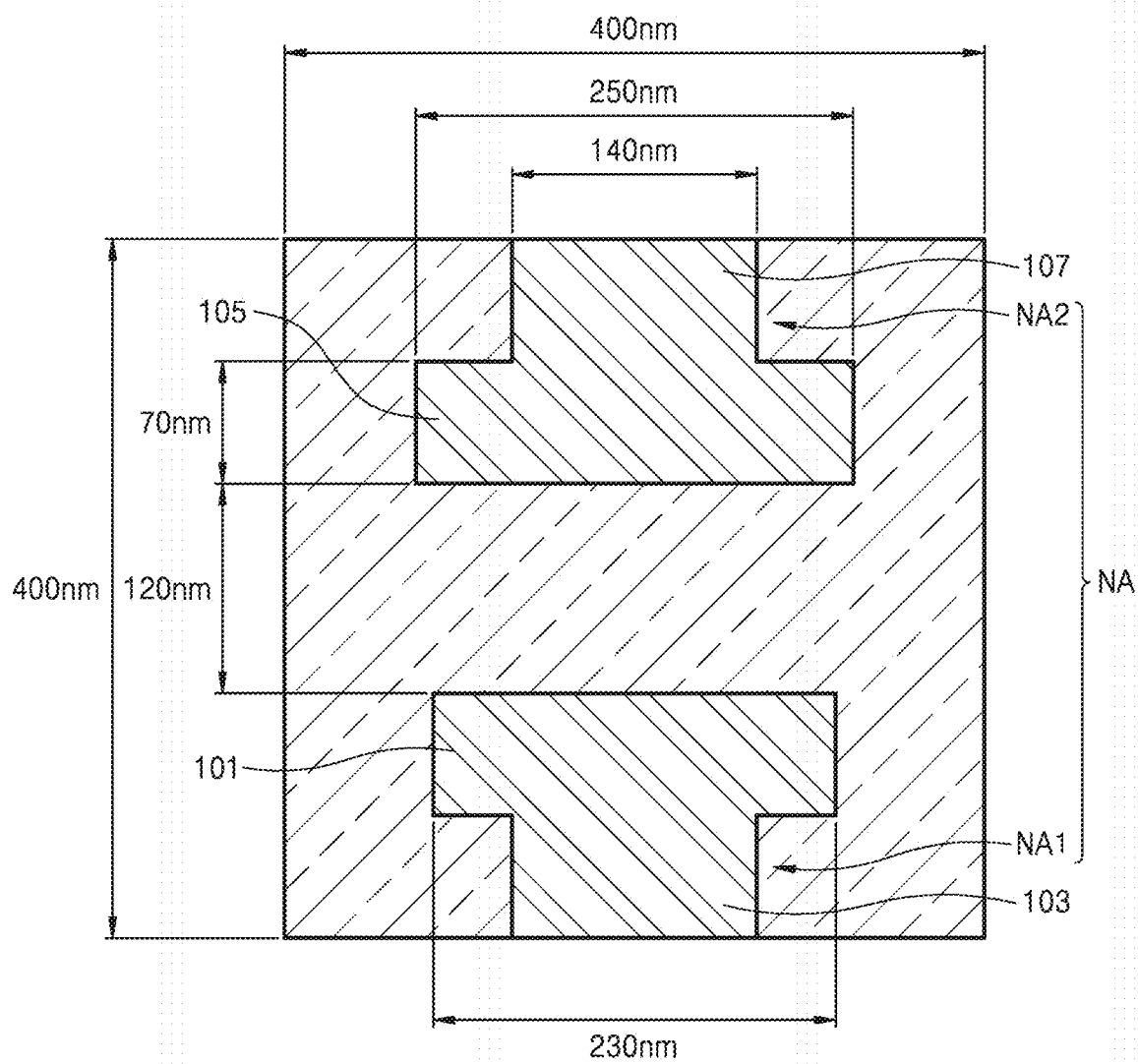
FIG. 9 is a plan view of an optical modulating device as a comparative example.
Figure 10B:
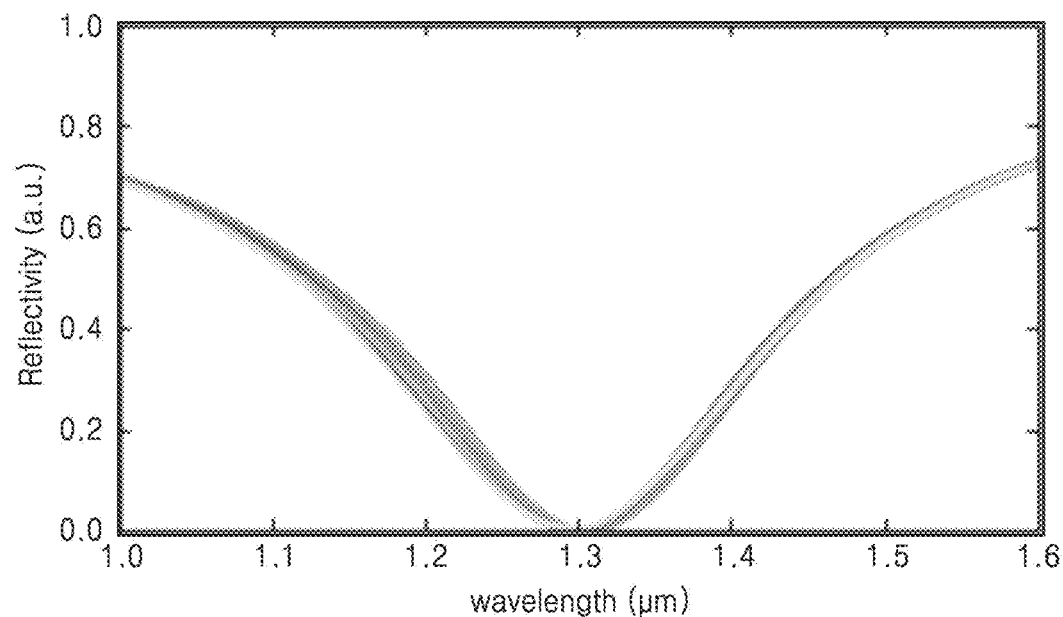
FIG. 10B is a graph showing reflectivity characteristics of the optical modulating device of FIG. 9, based on wavelengths.
Figure 10C:
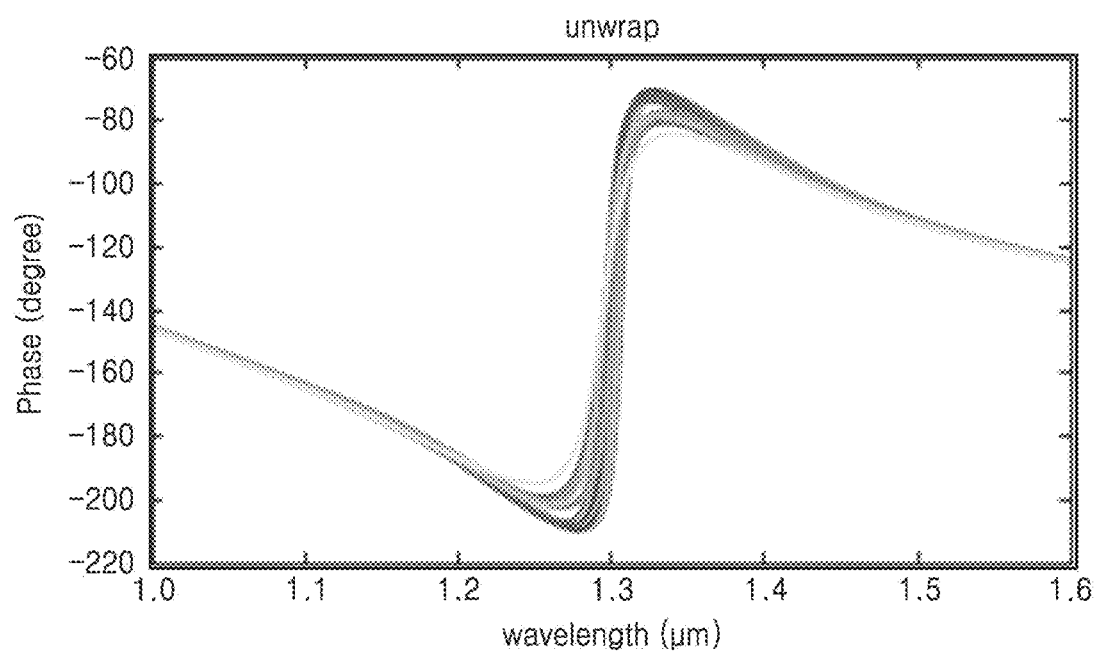
FIG. 10C is a diagram showing phase characteristics of the optical modulating device of FIG. 9, based on wavelengths.

FIG. 9 is a plan view of an optical modulating device as a comparative example. FIG. 10A is a graph showing phase changes of the optical modulating device, based on combinations of a voltage V1 of a first driver and a voltage V2 of a second driver applied to the optical modulating device of FIG. 9. FIG. 10B is a graph showing reflectivity characteristics of the optical modulating device of FIG. 9, based on wavelengths. FIG. 10C is a diagram showing phase characteristics of the optical modulating device 100 of FIG. 9, based on wavelengths. Dimensions of the optical modulating device 100 of FIG. 9 used to obtain the results shown in FIGS. 10A through 10C are identical to those of the optical modulating device 100 of FIG. 5 except that the distance D between the first and second nano-antennas NA1 and NA2 was changed to about 120 nm. As the distance D between the first and second nano-antennas NA1 and NA2 was changed to about 120 nm, lengths of the first electrode 103 and the second electrode 107 in the first direction were reduced.

Phase change was obtained by changing a combination of the first voltage V1 and the second voltage V2 applied to the optical modulating device as shown in FIG. 9 as indicated by the horizontal axis of the graph shown in FIG. 10A and gradually changing the wavelength of incident light as indicated by the horizontal axes of the graphs shown in FIGS. 10B and 10C.

As shown in FIGS. 10A through 10C, the maximum phase change amount 86.954 degrees was obtained at the wavelength of about 1.301 μm.

Based on the results shown in FIGS. 9 and 10A through 10C, even when the nano-antenna NA has a dual nano-antenna structure including the first and second nano-antennas NA1 and NA2, phase change amount is rapidly reduced when the distance between the first nano-antenna NA1 and the second nano-antenna NA2 exceeds a coupling distance.

Figure 11:
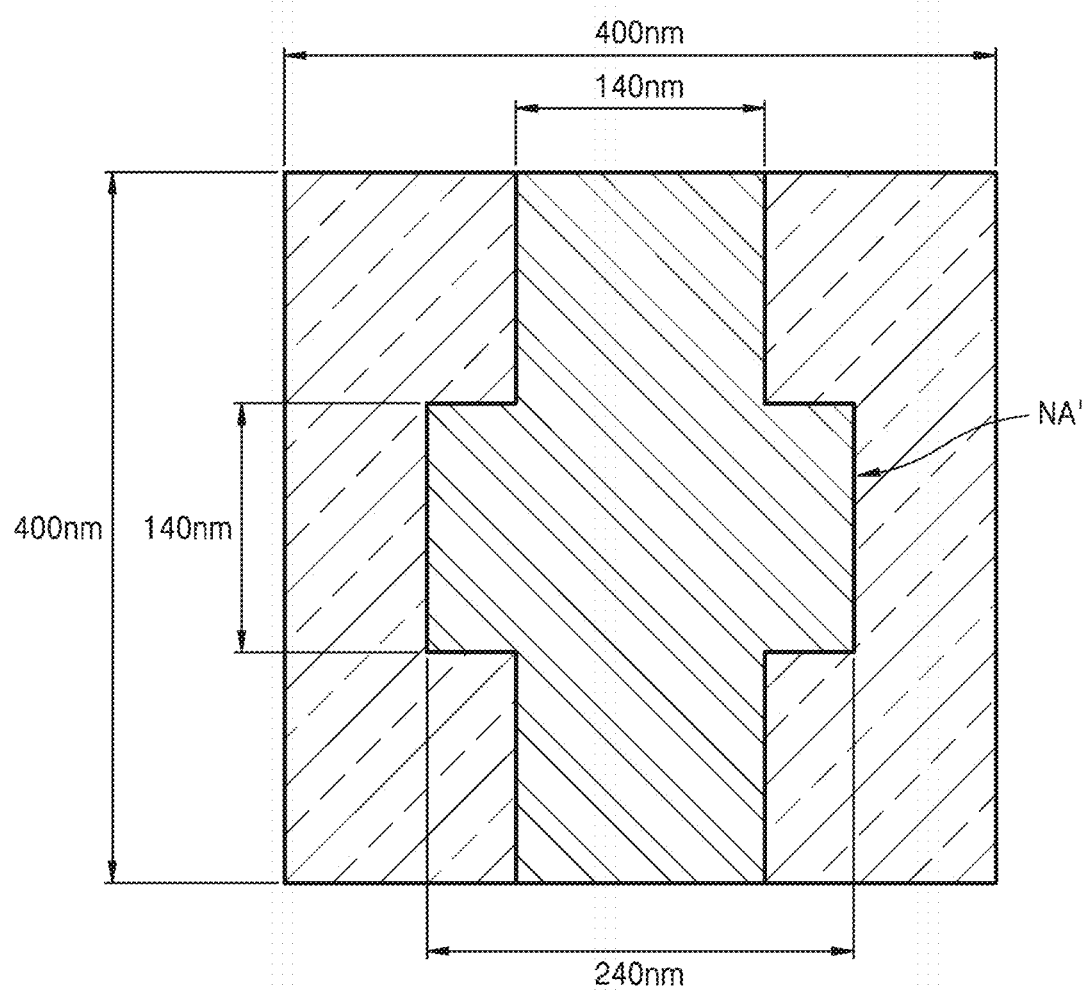
FIG. 11 is a plan view of an optical modulating device having a single nano-antenna structure as a comparative example.
Figure 12A:
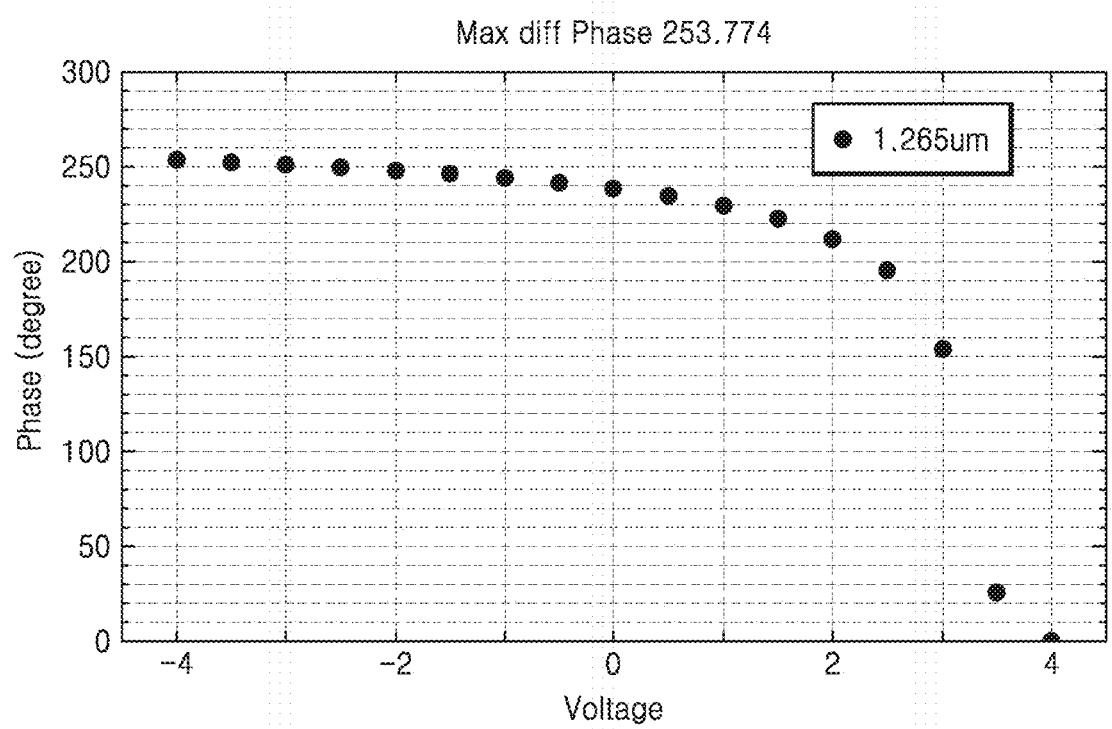
FIG. 12A is a graph showing phase changes of the optical modulating device, based on voltages applied to the optical modulating device of FIG. 11.
Figure 12B:
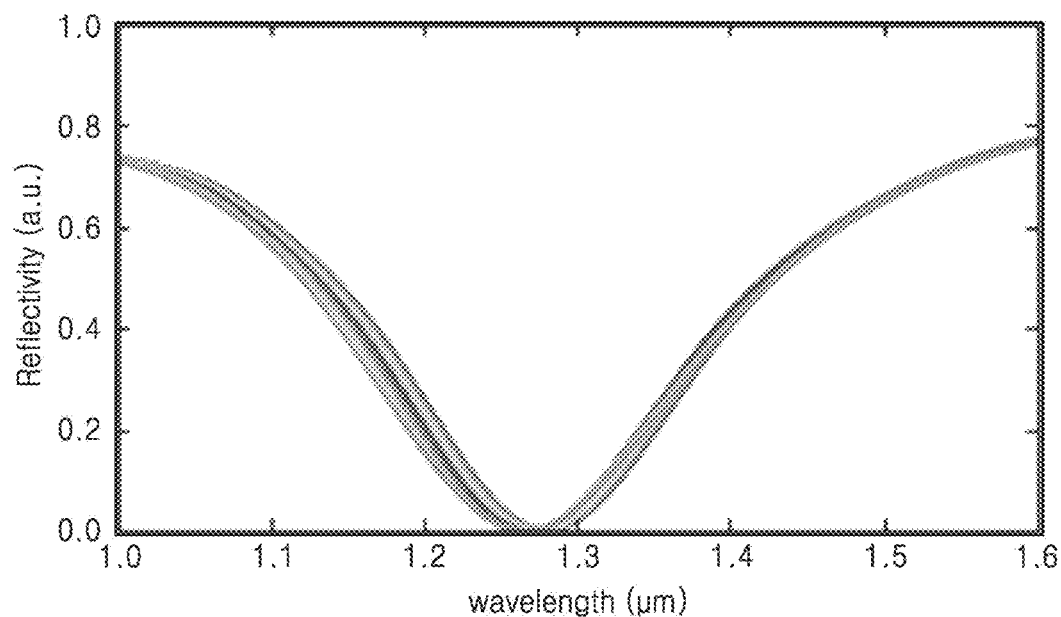
FIG. 12B is a graph showing reflectivity characteristics of the optical modulating device of FIG. 11, based on wavelengths.
Figure 12C:
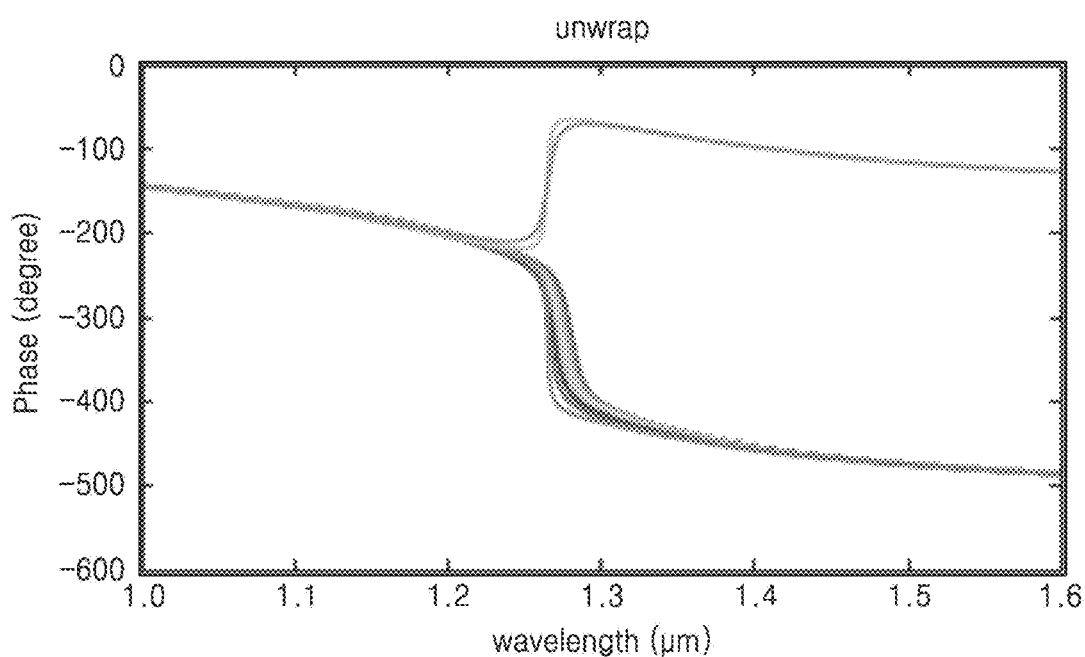
FIG. 12C is a diagram showing phase characteristics of the optical modulating device of FIG. 11, based on wavelengths.

FIG. 11 is a plan view of an optical modulating device having a single nano-antenna structure as a comparative example. FIG. 12A is a graph showing phase changes of the optical modulating device, based on voltages applied to the optical modulating device of FIG. 11. FIG. 12B is a graph showing reflectivity characteristics of the optical modulating device of FIG. 11, based on wavelengths. FIG. 12C is a diagram showing phase characteristics of the optical modulating device 100 of FIG. 11, based on wavelengths. The optical modulating device of FIG. 11 used to obtain the results shown in FIGS. 12a through 12C include a nano-antenna NA' having a single nano-antenna structure, where length of the nano-antenna NA' was about 240 nm, which is a the median of the lengths of the first nano-antenna NA1 and the second nano-antenna NA2 of the nano-antenna NA having dual nano-antenna structure in FIG. 5. The width of the nano-antenna NA' was about 140 nm, which corresponds to a sum of the widths of the first and second nano-antenna NA1 and NA2 of the nano-antenna NA of FIG. 5, and a width of an electrode and dimensions of a stacked structure including an active layer, a dielectric layer, and a metal layer were identical to those of the nano-antenna NA of FIG. 5. Compared to the optical modulating device 100 of FIG. 5, the nano-antenna NA' has a single nano-antenna structure, and thus length of the electrode is greater than the lengths of the first electrode 103 and the second electrode 107 of FIG. 5 in the first direction.

Phase change was obtained by changing a combination of the first voltage V1 and the second voltage V2 applied to the optical modulating device as shown in FIG. 11 as indicated by the horizontal axis of the graph shown in FIG. 12A and gradually changing the wavelength of incident light as indicated by the horizontal axes of the graphs shown in FIGS. 12B and 12C.

As shown in FIGS. 12A through 12C, the maximum phase change amount 253.774 degrees was obtained at the wavelength of about 1.265 μm.

As the results shown in FIGS. 11 and 12A through 12C, when the nano-antenna NA' has a single nano-antenna structure, the maximum phase change amount is about 253 degrees.

On the contrary, as in the optical modulating device 100 according to an exemplary embodiment, when the nano-antenna NA has a dual nano-antenna structure and the distance D between the first nano-antenna NA1 and the second nano-antenna NA2 is a coupling distance, the maximum phase change amount up to about 360 degrees may be obtained.

Although the optical modulating device 100 according to an exemplary embodiment is described above with reference to FIGS. 1 through 8, in the optical modulating device 100, a unit cell may include a plurality of arrays of the nano-antennas NA and, by changing phase change amounts of respective nano-antennas NA within the unit cell to be different from one another by adjusting a combination of first and second voltages V1 and V2 applied to the first nano-antenna NA1 and the second nano-antenna NA2 of each of the nano-antennas NA, the optical modulating device 100 may be applied to phase grating. Therefore, incident light may be diffracted and reflected by the optical modulating device 100. Here, because the amount of phase shift may be adjusted within a sufficiently wide range for each pixel, a diffraction angle of reflected light may be adjusted to a wide range.

Because a plurality of such phase-changeable optical modulating devices 100 may be manufactured as an array, the array may be mounted on a vehicle and thus, the array may be applied to a collision-proof system. For example, the optical modulating device 100 according to an exemplary embodiment may be applied as a beam steering device. Here, a unit cell of the beam steering device may include a plurality of arrays of the optical modulating devices 100 as described above with reference to FIGS. 1 through 8. Here, a beam steering device employing the optical modulating device 100 according to an exemplary embodiment may include a plurality of nano-antennas NA on the active layer 130.

In other words, the beam steering device employing the optical modulating device 100 according to an exemplary embodiment may include the active layer 130 of which refraction index is changed according to electric control, the first and second drivers 190 and 195 for electrically controlling the refraction index of the active layer 130, and the plurality of nano-antennas NA disposed on the active layer 130. Here, each of the plurality of nano-antennas NA has a dual nano-antenna structure including the first and second nano-antennas NA1 and NA2, which have different lengths and are apart from each other, and the first and second drivers 190 and 195 may be electrically connected to the first nano-antenna NA1 and the second nano-antenna NA2, respectively. The beam steering device employing the optical modulating device 100 according to an exemplary embodiment may further include the dielectric layer 140 between the active layer 130 and the plurality of nano-antennas NA and the metal layer 110 below the active layer 130.

Figure 13:
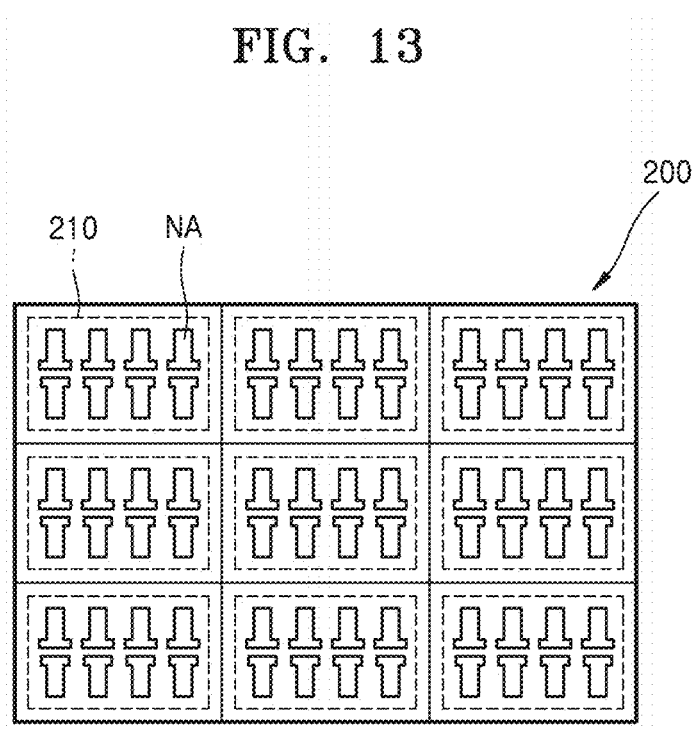
FIGS. 13 and 14 are schematic plan view diagrams showing examples of arrangements of pluralities of nano-antennas of beam steering devices employing the optical modulating device according to an exemplary embodiment.
Figure 14:
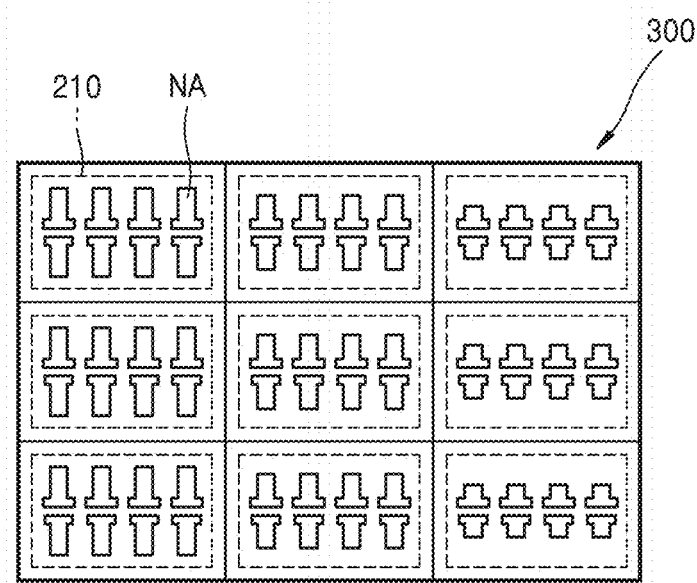

FIGS. 13 and 14 are schematic plan view diagrams showing examples of arrangements of pluralities of nano-antennas NA of beam steering devices 200 and 300 employing the optical modulating device 100 according to an exemplary embodiment.

As shown in FIGS. 13 and 14, a plurality of nano-antennas NA may be disposed in a unit cell 210 of the beam steering devices 200 and 300. Here, the number of nano-antennas NA disposed in the unit cell 210 may vary. Furthermore, sizes of the plurality of nano-antennas NA disposed in a unit cell may be identical to or different from that of one another. Here, each of the nano-antennas NA may include first and second nano-antennas NA1 and NA2 that are a coupling distance apart from each other.

FIG. 13 shows an example in which the plurality of nano-antennas NA have a same size in the each unit cell 210 and the nano-antennas NA have a same size in all of the unit cells 210. FIG. 14 shows an example in which the plurality of nano-antennas NA have a same size in the each unit cell 210 and size of the nano-antennas NA differs from one unit cell 210 to another. Here, the size of the nano-antenna NA that differs from one unit cell 210 to another may refer to any one or any combination of the length of the first nano-antenna NA1, the length of the second nano-antenna NA2, and a distance between the first nano-antenna NA1 and the second nano-antenna NA2.

Figure 15:
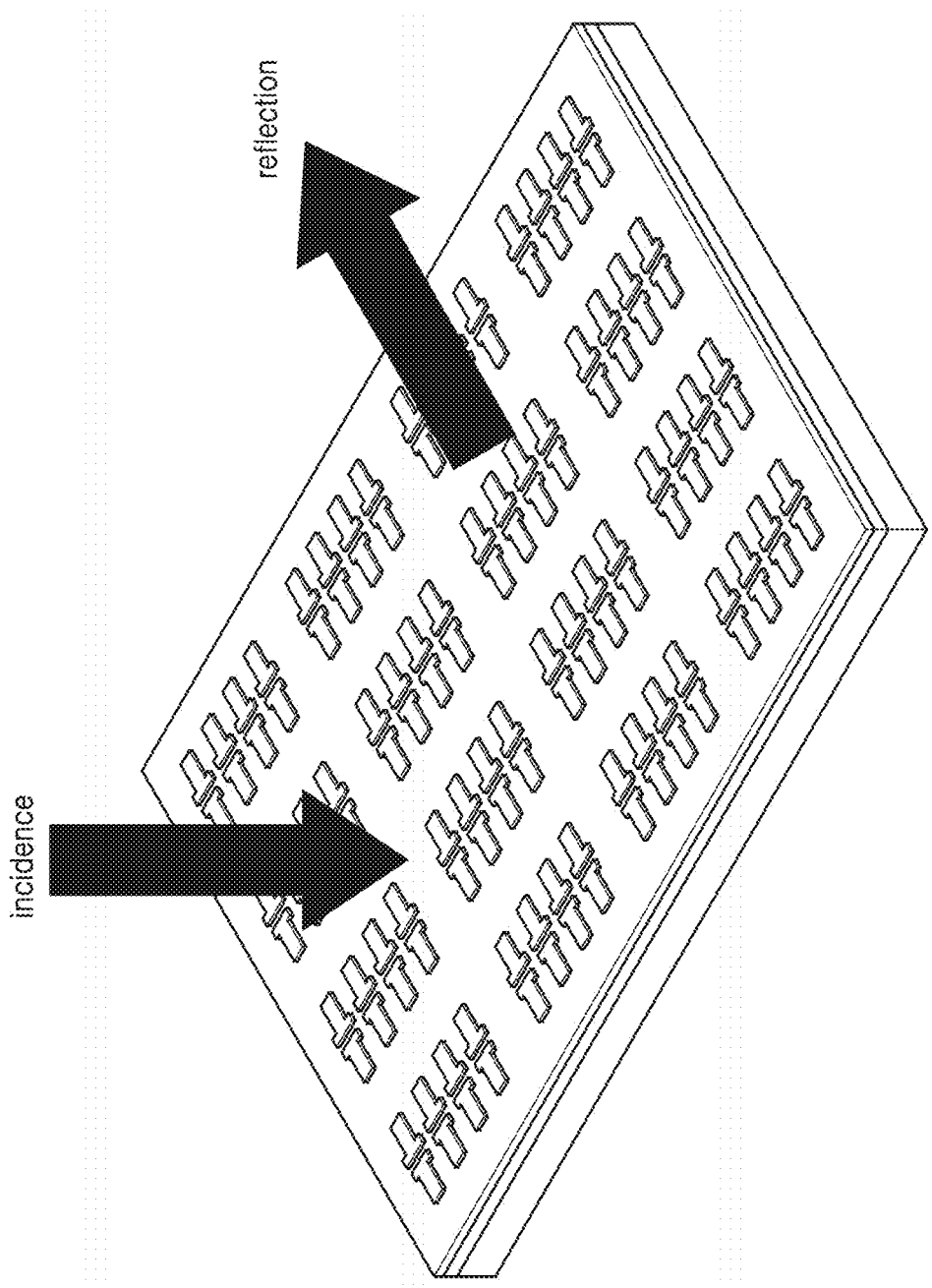
FIG. 15 is a schematic diagram showing an operating state of a beam steering device according to an exemplary embodiment.

FIG. 15 is a schematic diagram showing an operating state of a beam steering device according to an exemplary embodiment.

As shown in FIG. 15, when a light beam is incident to the beam steering device, the beam steering device reflects the incident light beam at an angle. Here, a direction in which reflected light travels may vary according to a combination of the first voltage V1 and the second voltage V2, wherein the first voltage V1 is applied to the first nano-antenna NA1 via the first driver 190 and the second voltage V2 is applied to the second nano-antenna NA2 via the second driver 195. By controlling charge density of the active layer 130 based on combinations of the first voltage V1 and the second voltage V2, the refraction index of the active layer 130 is changed, and the incident light beam is reflected according to the changed refraction index and is emitted at a desired angle.

Charge density of the active layer 130 may be increased by controlling a combination of the first voltage V1 and the second voltage V2 applied thereto and, as the charge density increases, phase shift amount of a light beam reflected by the beam steering device may also increase. Diffraction angle of the reflected light beam may be controlled by adjusting phase shift amounts of respective pixels based on change of the refraction index of the active layer 130.

A direction in which a light beam travels may be determined by increasing or decreasing phase of each pixel of the beam steering device by an amount. Here, the direction in which a light beam travels may be changed based on an amount of phase change of each pixel of the beam steering device that is increased or decreased by an amount.

Here, the beam steering device employing the optical modulating device 100 according to an exemplary embodiment may obtain a large maximum phase change up to about 360 degrees, the beam steering device may significantly change the direction in which a light beam travels.

Figure 16:
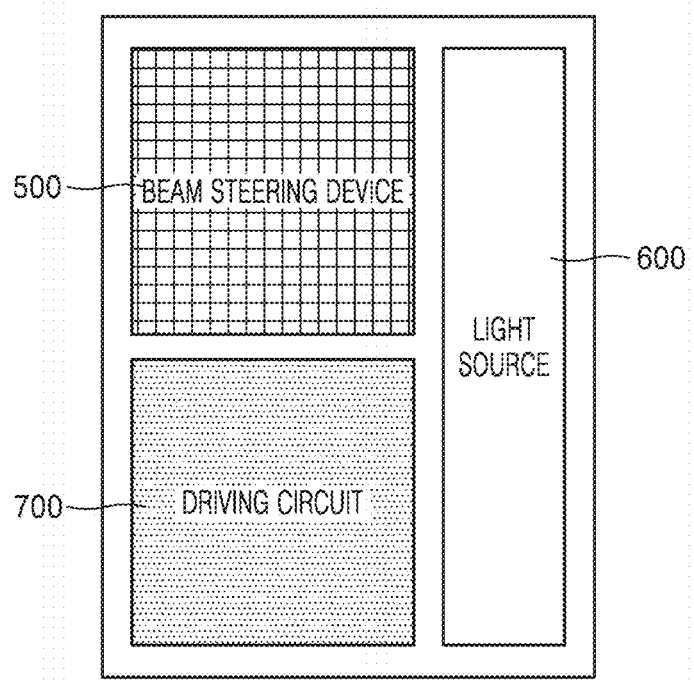
FIG. 16 is a block diagram of a system employing a beam steering device according to an exemplary embodiment.

FIG. 16 is a block diagram of a system employing a beam steering device according to an exemplary embodiment.

Referring to FIG. 16, a system employing a beam steering device 500 according to an exemplary embodiment may be a solid state meta LiDAR system, for example, where a meta-photonic chip type beam steering device 500, a driving circuit 700, and a light source 600 may be disposed on a substrate. The beam steering device 500 may be the beam steering device 200 or 300 according to the exemplary embodiments described above, for example.

For example, the light source 600 may be a laser beam source, such as a laser diode, a light source, such as a light-emitting diode, or one of various other types of light sources. When a laser beam source is applied as the light source 600, the beam steering device 200 or 300 steers a laser beam to a desired location.

The beam steering device 200 or 300 according to an exemplary embodiment and a system employing the same includes a plurality of nano-antennas NA including a first nano-antenna NA1 and a second nano-antenna NA2 that may be coupled with each other, and thus beam reflection efficiency and beam directivity regarding a desired location may be significantly improved. Furthermore, beam directivity characteristic may be further improved by adjusting lengths of the first and second nano-antennas NA1 and NA2, a distance therebetween, and a combination of a first voltage V1 and a second voltage V2 applied to the first and second nano-antennas NA1 and NA2. Furthermore, because the beam steering device 200 or 300 according to an exemplary embodiment and the system employing the same exhibit improved beam directivity characteristic, an optical system for preventing beam spread may be minimized or omitted, and thus the overall system may be simplified.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An optical modulating device comprising:
an active layer;
a driver configured to electrically control a refraction index of the active layer; and
a nano-antenna disposed on the active layer, and having a dual nano-antenna structure comprising:
a first nano-antenna portion;
a first electrode extending from the first nano-antenna portion at a first angle;
a second nano-antenna portion; and
a second electrode extending from the second nano-antenna portion at a second angle,
wherein the first nano-antenna portion has a first length in a first direction, the first length being different from a second length of the second nano-antenna portion in the first direction,
wherein the first nano-antenna portion is spaced apart from the second nano-antenna portion by a gap in a second direction crossing the first direction, and wherein the driver comprises a first driver electrically connected to the first nano-antenna portion, and a second driver electrically connected to the second nano-antenna portion,
wherein the first electrode extends away from the second nano-antenna portion in the second direction without extending into the gap,
wherein the second electrode extends away from the first nano-antenna portion in the second direction without extending into the gap,
wherein the gap between the first nano-antenna portion and the second nano-antenna portion is formed by an empty space without including any electrode, and
wherein the first electrode extends in a first extension direction from the first nano-antenna and the second electrode extends in a second extension direction opposite to the first extension direction from the second nano-antenna portion, the first extension direction and the second extension direction being perpendicular to the first direction.

2. The optical modulating device of claim 1, wherein, when the first length of the first nano-antenna portion is denoted by L1, the second length of the second nano-antenna portion is denoted by L2, and a distance between the first nano-antenna portion and the second nano-antenna portion is denoted by D, L1≠L2, and D is less than L1 and L2, and is a coupling distance over which the first nano-antenna portion and the second nano-antenna portion are able to be coupled.

3. The optical modulating device of claim 1, wherein the nano-antenna satisfies any one or any combination of conditions comprising:
the first length of the first nano-antenna portion being from about 230 nm to about 270 nm;
the second length of the second nano-antenna portion being from about 210 nm to about 250 nm;
a distance between the first nano-antenna portion and the second nano-antenna portion being less than about 120 nm; and
a first width of either one or both of the first nano-antenna portion and the second nano-antenna portion that is parallel to the second direction being from about 60 nm to about 80 nm.

4. The optical modulating device of claim 3, wherein a second width of either one or both of the first electrode and the second electrode that is parallel to the first direction is from about 100 nm to about 180 nm.

5. The optical modulating device of claim 1, wherein the first nano-antenna portion is parallel to the second nano-antenna portion.

6. The optical modulating device of claim 1, further comprising a metal layer disposed below the active layer.

7. The optical modulating device of claim 1, further comprising a dielectric layer disposed between the active layer and the nano-antenna.

8. The optical modulating device of claim 1, further comprising an array of nano-antennas disposed on the active layer.

9. The optical modulating device of claim 1, wherein the first electrode and the second electrode are collinear.

10. The optical modulating device of claim 1, wherein the nano-antenna has a cross shape, and
wherein the gap extends through a central portion of the cross shape in the first direction from an edge of the nano-antenna to an opposite edge of the nano-antenna.

11. The optical modulating device of claim 1, wherein the first nano-antenna portion comprises a first rectangular face defining a first side of the gap and the second nano-antenna portion comprises a second rectangular face defining a second side of the gap, and
wherein a length of the first rectangular face is different from a length of the second rectangular face.

12. A beam steering device comprising:
an active layer;
a driver configured to electrically control a refraction index of the active layer; and
a plurality of nano-antennas disposed on the active layer, each of the plurality of nano-antennas being spaced apart from each other in a first direction, and each of the plurality of nano-antennas comprising:
a first nano-antenna portion;
a first electrode extending from the first nano-antenna portion at a first angle;
a second nano-antenna portion; and
a second electrode extending from the second nano-antenna portion at a second angle,
wherein the first nano-antenna portion has a first length in the first direction, the first length being different from a second length of the second nano-antenna portion in the first direction, and
wherein the first nano-antenna portion is spaced apart from the second nano-antenna portion by a gap in a second direction crossing the first direction,
wherein the first electrode extends away from the second nano-antenna portion in the second direction without extending into the gap,
wherein the second electrode extends away from the first nano-antenna portion in the second direction without extending into the gap,
wherein the gap between the first nano-antenna portion and the second nano-antenna portion is formed by an empty space without including any electrode, and
wherein the first electrode extends in a first extension direction from the first nano-antenna and the second electrode extends in a second extension direction opposite to the first extension direction from the second nano-antenna portion, the first extension direction and the second extension direction being perpendicular to the first direction.

13. The beam steering device of claim 12, wherein, when the first length of the first nano-antenna portion is denoted by L1, the second length of the second nano-antenna portion is denoted by L2, and a distance between the first nano-antenna portion and the second nano-antenna portion is denoted by D, $L1 \neq L2$, and D is less than L1 and L2, and is a coupling distance over which the first nano-antenna portion and the second nano-antenna portion are able to be coupled.

14. The beam steering device of claim 12, wherein each of the plurality of nano-antennas satisfies any one or any combination of conditions comprising:
the first length of the first nano-antenna portion being from about 230 nm to about 270 nm;
the second length of the second nano-antenna portion being from about 210 nm to about 250 nm;
a distance between the first nano-antenna portion and the second nano-antenna portion being less than about 120 nm; and
a first width of either one or both of the first nano-antenna portion and the second nano-antenna portion that is parallel to the second direction being from about 60 nm to about 80 nm.

15. The beam steering device of claim 14, wherein a second width of either one or both of the first electrode and the second electrode that is parallel to the first direction is from about 100 nm to about 180 nm.

16. The beam steering device of claim 12, wherein the first nano-antenna portion is parallel to the second nano-antenna portion.

17. The beam steering device of claim 12, further comprising a metal layer disposed below the active layer.

18. The beam steering device of claim 12, further comprising a dielectric layer disposed between the active layer and the plurality of nano-antennas.

19. A system comprising:
the beam steering device of claim 12, the beam steering device being configured to steer an incident light beam to be reflected at an angle;
a driving circuit configured to electrically control the active layer; and
a light source configured to emit the incident light beam to the beam steering device.

* * * * *